US012028677B2

(12) United States Patent
Park et al.

(10) Patent No.: US 12,028,677 B2
(45) Date of Patent: Jul. 2, 2024

(54) SOUND OUTPUT DEVICE AND DISPLAY DEVICE INCLUDING SAME

(71) Applicant: SAMSUNG ELECTRONICS CO., LTD., Suwon-si (KR)

(72) Inventors: Dongkyu Park, Suwon-si (KR); Sangchul Ko, Suwon-si (KR); Donghyun Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 186 days.

(21) Appl. No.: 17/685,690

(22) Filed: Mar. 3, 2022

(65) Prior Publication Data

US 2022/0191612 A1 Jun. 16, 2022

Related U.S. Application Data

(63) Continuation of application No. PCT/KR2019/017836, filed on Dec. 16, 2019.

(30) Foreign Application Priority Data

Sep. 6, 2019 (KR) ........................ 10-2019-0110502

(51) Int. Cl.
*H04R 1/28* (2006.01)
*H04R 1/02* (2006.01)
(Continued)

(52) U.S. Cl.
CPC ........... *H04R 1/2857* (2013.01); *H04R 1/028* (2013.01); *H04R 1/288* (2013.01); *H04R 9/025* (2013.01); *H04R 9/06* (2013.01); *H04R 2499/15* (2013.01)

(58) Field of Classification Search
CPC ............................ H04R 1/2853; H04R 1/2857
(Continued)

(56) References Cited

U.S. PATENT DOCUMENTS 5,313,525 A 5/1994 Klasco
5,432,860 A 7/1995 Kasajima et al.
(Continued)

FOREIGN PATENT DOCUMENTS

CN 1134651 A 10/1996
CN 102742298 A 10/2012
(Continued)

OTHER PUBLICATIONS

Communication dated Jun. 5, 2020, issued by the International Searching Authority in counterpart International Application No. PCT/KR2019/017836 (PCT/ISA/210).
(Continued)

*Primary Examiner* — Katherine A Faley
(74) *Attorney, Agent, or Firm* — Sughrue Mion, PLLC

(57) ABSTRACT

A sound output device according to an embodiment of the present disclosure includes: a speaker configured to generate sound; a guide tube formed in a shape of a hollow tube, the guide tube configured to receive the sound generated from the speaker, through an end of the guide tube, and output the received sound; and a waveguide disposed between the speaker and the guide tube. The waveguide includes: a throat tube configured to connect the speaker and the guide tube to each other, and formed in a shape of a hollow tube, and at least one path change structure configured to adjust a predetermined frequency band of the sound in a process of transmitting the sound generated from the speaker to the guide tube.

16 Claims, 12 Drawing Sheets

(51) Int. Cl.
*H04R 9/02* (2006.01)
*H04R 9/06* (2006.01)

(58) Field of Classification Search
USPC .......................................... 381/337, 338, 343
See application file for complete search history.

(56) References Cited

U.S. PATENT DOCUMENTS

| | | | |
|---|---|---|---|
| 5,524,062 | A | 6/1996 | Oh |
| 5,793,000 | A | 8/1998 | Sabato et al. |
| 5,929,392 | A | 7/1999 | Sabato et al. |
| 5,932,850 | A | 8/1999 | Sabato et al. |
| 6,343,133 | B1 | 1/2002 | Adamson |
| 6,411,721 | B1 | 6/2002 | Spindler |
| 6,418,229 | B1 | 7/2002 | Staat |
| 8,358,798 | B2 | 1/2013 | Ickler et al. |
| 8,447,055 | B2 | 5/2013 | Jankovsky et al. |
| 8,699,738 | B2 | 4/2014 | Saiki |
| 9,398,369 | B2 | 7/2016 | Yang |
| 10,171,930 | B1 | 1/2019 | Brown |
| 10,327,066 | B2 | 6/2019 | Jung et al. |
| 10,555,072 | B2 | 2/2020 | Voishvillo |
| 10,880,637 | B2 | 12/2020 | Park et al. |
| 11,006,210 | B2 | 5/2021 | Ko et al. |
| 11,051,103 | B2 | 6/2021 | Jung et al. |
| 2002/0114482 | A1 | 8/2002 | Adamson |
| 2005/0265570 | A1* | 12/2005 | Isotalo ..................... H04R 1/30 381/337 |
| 2007/0080019 | A1 | 4/2007 | Kubota |
| 2012/0300967 | A1 | 11/2012 | Saiki |
| 2015/0373445 | A1 | 12/2015 | Voishvillo |
| 2016/0134861 | A1 | 5/2016 | Huang |
| 2016/0212523 | A1 | 7/2016 | Spllmann et al. |
| 2018/0167724 | A1* | 6/2018 | Jung ...................... H04R 1/026 |
| 2018/0359558 | A1 | 12/2018 | Mathur |
| 2019/0069089 | A1 | 2/2019 | Jung et al. |

FOREIGN PATENT DOCUMENTS

| | | | |
|---|---|---|---|
| CN | 103929693 | A | 7/2014 |
| CN | 105323665 | A | 2/2016 |
| CN | 108235193 | A | 6/2018 |
| CN | 208205043 | U | 12/2018 |
| CN | 109429027 | A | 3/2019 |
| JP | 8-47076 | A | 2/1996 |
| JP | 8-140178 | A | 5/1996 |
| JP | 11-252672 | A | 9/1999 |
| JP | 11-275679 | A | 10/1999 |
| JP | 2007-067959 | A | 3/2007 |
| KR | 10-2018-0066923 | A | 6/2018 |
| KR | 10-1949851 | B1 | 2/2019 |
| KR | 10-2019-0021602 | A | 3/2019 |
| KR | 10-2019-0062902 | A | 6/2019 |
| KR | 10-2020-0006458 | A | 1/2020 |
| WO | 2015/132855 | A1 | 9/2015 |
| WO | 2016/134861 | A1 | 9/2016 |
| WO | 2017/196631 | A1 | 11/2017 |
| WO | 2018/105949 | A1 | 6/2018 |

OTHER PUBLICATIONS

Communication dated Jun. 5, 2020, issued by the International Searching Authority in counterpart International Application No. PCT/KR2019/017836 (PCT/ISA/237).
Holland et al., "A Low-Cost End-Fire Acoustic Radiator," J. Audio Eng. 540 Soc., vol. 39, No. 7/8, 1991, pp. 540-550.
Communication issued May 10, 2022 by the Indian Patent Office in counterpart Indian Patent Application No. 201917054436.
Communication issued Jun. 8, 2022 by the European Patent Office in counterpart European Patent Application No. 19944113.0.
Hearing Notice dated Apr. 23, 2023, issued by the India Patent Office for Indian Patent Application No. 201917054436.
Office Action dated Jun. 20, 2023, issued by the Korean Patent Office for Korean Patent Application No. 10-2019-0110502.
Chen Yang, "The know-how of Yili speaker Hi-Fi", Practical audio-visual technology, Electronic Technology & Information Science, Dec. 31, 2009, 11 pages.
Office Action issued on Nov. 24, 2023 by the Chinese Patent Office in corresponding CN Patent Application No. 201980098154.X.
European Extended Search Report issued Feb. 14, 2024 issued by the European Patent Office for EP Patent Application No. 19944113. 0.

* cited by examiner

SOUND OUTPUT DEVICE AND DISPLAY DEVICE INCLUDING SAME

CROSS-REFERENCE TO THE RELATED APPLICATIONS

This application is a bypass Continuation Application of PCT Application No. PCT/KR2019/017836, filed on Dec. 16, 2019, which claims priority to Korean Application No. 10-2019-0110502, filed in the Korean Patent Office on Sep. 6, 2019, the contents of which are incorporated herein by reference in their entirety.

BACKGROUND

Field

Apparatuses and methods consistent with embodiments of the disclosure relate to an improved sound output device to reduce sound quality degradation and a display device including the same.

Description of Related Art

A display device may refer to a device which displays an image by receiving an image signal, and includes a television, a monitor, etc.

In recent years, to have a maximized screen size and a minimized overall size of the display device, a display has been designed to have a slim thickness with minimal or no bezel.

The display device of this design may include a speaker to output sound to the outside in a state of being hidden in the display.

SUMMARY

There is a problem of a need for a sound output device capable of improving response characteristics of an output sound.

Embodiments of the disclosure provide a sound output device capable of improving response characteristics of an output sound by controlling destructive interference of the sound generated from a speaker.

According to embodiments, a sound output device is provided. The sound output device includes: a speaker configured to generate sound; a guide tube formed in a shape of a hollow tube, the guide tube configured to receive the sound generated from the speaker, through an end of the guide tube, and output the received sound; and a waveguide disposed between the speaker and the guide tube, wherein the waveguide includes: a throat tube configured to connect the speaker and the guide tube to each other, and formed in a shape of a hollow tube, and at least one path change structure configured to adjust a predetermined frequency band of the sound in a process of transmitting the sound generated from the speaker to the guide tube.

According to one or more embodiments, the at least one path change structure is disposed outside the throat tube, includes a first end that is open and connected to the speaker, and further includes a second end, opposite to the first end, that is closed.

According to one or more embodiments, the at least one path change structure further includes a plurality of slits forming an extension path of the at least one path change structure, the extension path having a length longer than a length of the speaker.

According to one or more embodiments, the plurality of slits extend parallel to each other, and are spaced from each other in a first direction from the first end toward the second end of the at least one path change structure.

According to one or more embodiments, the plurality of slits extend parallel to each other in a second direction that is perpendicular to the first direction.

According to one or more embodiments, the plurality of slits alternately protrude from two sidewalls of the at least one path change structure, between the first end and the second end of the at least one path change structure.

According to one or more embodiments, the at least one path change structure is a plurality of path change structures that are symmetrical to each other with respect to the throat tube.

According to one or more embodiments, the at least one path change structure is disposed in the throat tube.

According to one or more embodiments, the at least one path change structure is configured to adjust the predetermined frequency band of the sound generated from the speaker.

According to one or more embodiments, the at least one path change structure is spaced apart from a sidewall of the throat tube.

According to one or more embodiments, the at least one path change structure is formed in a round, oval, or quadrangular shape.

According to one or more embodiments, the at least one path change structure includes a sound absorbing material.

According to one or more embodiments, the speaker includes a voice coil, a magnet, and a vibration plate that is configured to be vibrated by the voice coil and the magnet to generate the sound.

According to one or more embodiments, a throat of the throat tube has a smaller length than a length of the vibration plate of the speaker.

According to embodiments, a display device is provided. The display device includes: a display configured to display an image; and at least one sound output device disposed at one side of the display. The at least one sound output device includes: a speaker configured to generate sound, a guide tube formed in a shape of a hollow tube, the guide tube configured to receive the sound generated from the speaker, through an end of the guide tube, and output the received sound, and a waveguide disposed between the speaker and the guide tube, and wherein the waveguide includes at least one path change structure configured to adjust a predetermined frequency band of the sound in a process of transmitting the sound generated from the speaker to the guide tube.

According to one or more embodiments, the at least one sound output device is a plurality of sound output devices that are disposed, at the display, symmetrical with respect to each other in left and right directions.

According to one or more embodiments, the waveguide further includes a throat tube configured to connect the speaker and the guide tube to each other, and the throat tube is formed in a shape of a hollow tube, and the at least one path change structure is disposed outside the throat tube, includes a first end that is open and connected to the speaker, and further includes a second end, opposite to the first end, that is closed.

According to one or more embodiments, the at least one path change structure includes a plurality of slits forming an extension path of the at least one path change structure, the extension path having a length longer than a length of the speaker.

According to one or more embodiments, the waveguide further includes a throat tube configured to connect the speaker and the guide tube to each other, and the throat tube is formed in a shape of a hollow tube, and the at least one path change structure is disposed in the throat tube.

According to one or more embodiments, the at least one path change structure is configured to adjust the predetermined frequency band of the sound generated from the speaker.

DETAILED DESCRIPTION

The example embodiments described below are illustratively provided to assist in understanding of the disclosure, and it is to be understood that embodiments of the disclosure may be variously modified and executed. However, when detailed description for known functions or components related to the disclosure may obscure the gist of the disclosure, the detailed description and concrete illustration may be omitted. Further, the accompanying drawings are not illustrated to scale, and sizes of some of components may be exaggerated to assist in the understanding of the disclosure.

Terms used in the specification, 'first', 'second' and the like may be used to describe various components, and the components are not to be interpreted to be limited to the terms. These terms may be used to differentiate one component from other components. For example, a 'first' component may be named a 'second' component and the 'second' component may also be similarly named the 'first' component, without departing from the scope of the disclosure.

Terms used in the embodiments of the disclosure may be interpreted to have meanings that are generally known to those skilled in the art unless defined otherwise.

In addition, terms such as 'fore end', 'rear end', 'upper portion', 'lower portion', 'upper end', 'lower end' and the like used in the disclosure are defined based on the drawings. The shapes and positions of respective components are not limited to these terms.

Figure 1:
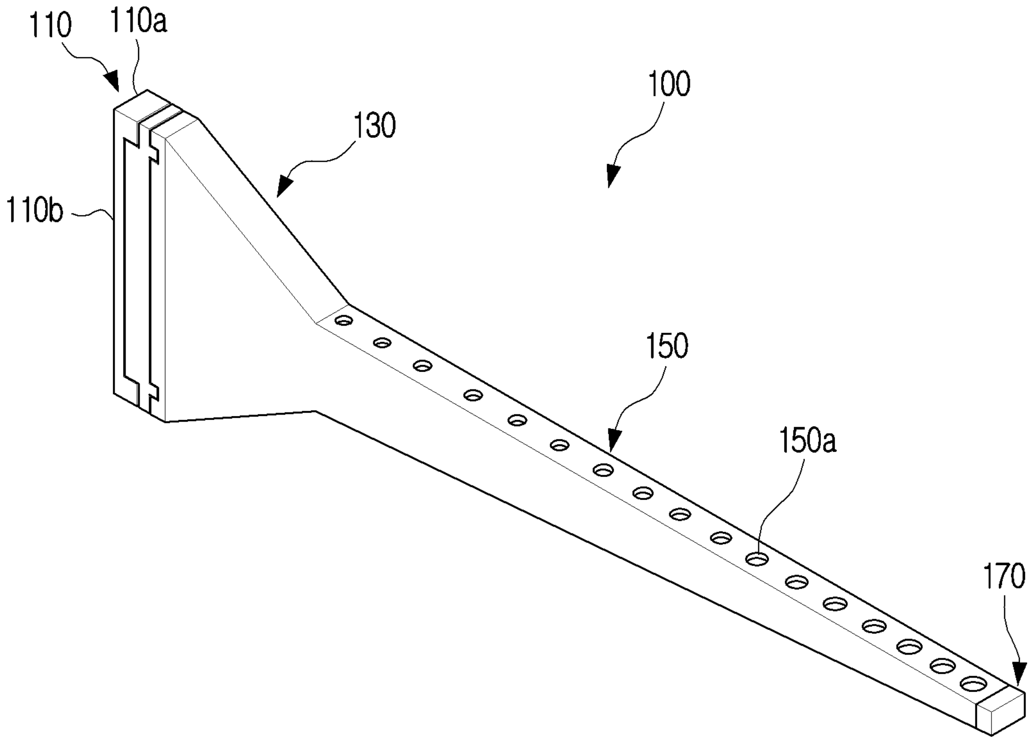
FIG. 1 is a perspective view of a sound output device according to an embodiment in the disclosure.

FIG. 1 is a perspective view of a sound output device according to an embodiment in the disclosure.

Referring to FIG. 1, a sound output device 100 according to an embodiment in the disclosure may include: a speaker 110 configured to generate sound; a guide tube 150 formed in a shape of a hollow tube and configured to receive the sound generated from the speaker 110 through one end of the guide tube and output the received sound; and a waveguide 130 disposed between the speaker 110 and the guide tube 150.

The speaker 110 may serve to generate sound, and the sound generated from the speaker 110 may be transmitted to the guide tube 150 through the waveguide 130.

The speaker 110 may have a first side surface 110*a* smaller than a second side surface 110*b* as a display device 1 (see FIG. 9) including the speaker 110 becomes slim. In detail, the second side surface 110*b* may be longer than the first side surface 110*a* to reduce a volume of the speaker 110.

The speaker 110 may be formed in an oval type having an oval cross section to secure a maximum opening surface compared to an area of a vibration plate 115 to be described below. Meanwhile, the speaker 110 according to an embodiment in the disclosure is described as the oval type having the oval cross section, but is not limited thereto. The speaker 110 may be formed in a rectangular bar type having a cross section in which the second side surface 110*b* is formed longer than the first side surface 110*a*.

The speaker 110 may extend a reproduction band as compared to a speaker having a conventional square cross section.

The waveguide 130 may serve to transmit the sound generated from the speaker 110 to the guide tube 150, and adjust a predetermined frequency band of the sound in a process of transmitting the sound generated from the speaker 110 to the guide tube 150.

The waveguide 130 may reduce interference caused by a mode depending on a length of the speaker 110, i.e. the interference occurring in the speaker 110 having the second side surface 110*b* formed in an elongated shape.

In detail, the speaker 110 may have the second side surface 110*b* formed in the elongated shape, interference may thus be caused by the mode depending on the length of the second side surface 110*b* of the speaker 110. This interference may degrade response characteristics of a certain frequency. The waveguide 130 may include a path change member 135 (see FIG. 2) to be described below to minimize the interference caused by the longitudinal mode of the speaker 110. The path change members of embodiments of the present disclosure, including the path change member 135, may also be referred to as a path change structure.

The other end of the waveguide 130 may be connected to one end of the guide tube 150.

The guide tube 150 may include a plurality of radiation holes 150*a* in at least one surface thereof to allow sound to be radiated to the outside in a longitudinal direction of the guide tube 150. The plurality of radiation holes 150*a* may be spaced apart from each other at a predetermined interval.

It is described that the radiation holes 150*a* are formed in at least one surface of the guide tube 150, but are not limited thereto. Such radiation holes 150*a* may not be formed in the guide tube 150, and the sound may be output through the other end of the guide tube 150, that may be open. The guide tube 150 may be formed in various shapes to receive the sound generated from the speaker 110 and to output the received sound.

The guide tube 150 may partially radiate the sound through each of the radiation holes 150*a* in a process of passing the sound transmitted through the waveguide 130 through the guide tube 150.

The guide tube 150 may have the other end formed to be open. The sound output device 100 may further include a cap 170 covering the other end of the open guide tube 150.

As such, the sound output device according to an embodiment in the disclosure may improve degradation of acoustic characteristics by improving the response characteristics of the output sound.

Figure 2:
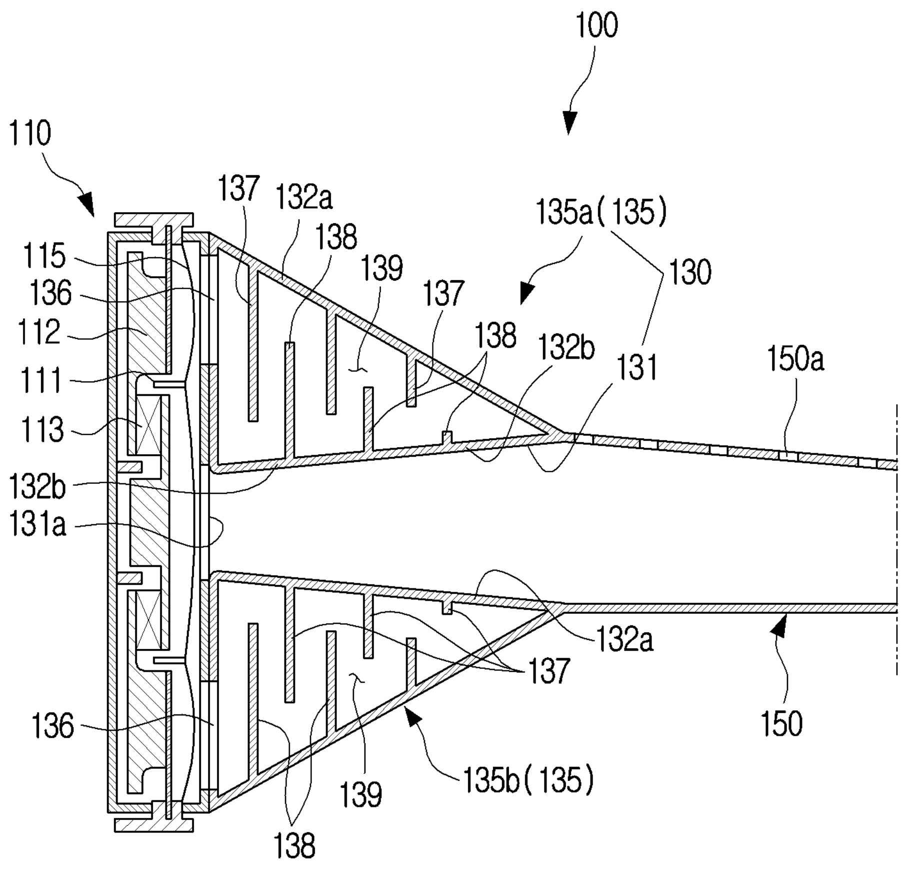
FIG. 2 is a partially enlarged view of a cross-section of a sound output device according to an embodiment in the disclosure.

FIG. 2 is a partially enlarged view of a cross-section of a sound output device according to an embodiment in the disclosure.

Referring to FIG. 2, the speaker 110 may include a voice coil 111, a magnet 113, and the vibration plate 115.

The voice coil 111 may be formed by winding a coil coated with an insulating layer and an adhesive layer on a conductor such as copper, aluminum or the like. The voice coil 111 may be disposed between the magnet 113 and a lower yoke 112. The voice coil 111 may generate the sound by transmitting vibration to the vibration plate 115, the vibration generated by an interaction between an electric field generated by a current flow and a magnetic field generated by the magnet 113.

An alternating current (AC) signal having various frequency bands may be input to the voice coil 111. In case that an alternating current is input to the voice coil 111, a force may act on the voice coil 111. Due to this force, the vibration plate 115 attached to the voice coil 111 may be vibrated with a signal of an audible frequency band, thereby generating the sound.

The waveguide 130 may be disposed between the speaker 110 and the guide tube 150. The waveguide 130 may include a throat tube 131 and at least one path change member 135.

The throat tube 131 may be disposed between the speaker 110 and the guide tube 150. The throat tube 131 may have one end at which the speaker 110 is disposed and the other end to which one end of the guide tube 150 is connected.

The throat tube 131 may be formed in a shape of a hollow tube. An inside of the throat tube 131 may have a gradually increasing width. Accordingly, the throat tube 131 may guide the sound generated from the speaker 110 to the guide tube 150 and may reduce noise which may occur due to a sudden pressure change.

A throat 131*a* of the throat tube 131 may have a smaller length than the vibration plate 115 of the speaker 110.

The path change member 135 may be configured to adjust a predetermined frequency band of the sound in the process of transmitting the sound generated from the speaker 110 to the guide tube 150, and the path change member 135 may have one end at which the speaker 110 is disposed.

The path change member 135 may be disposed outside the throat tube 131. In detail, the throat tube 131 may be positioned at a center of the other end of the speaker 110, and the path change member 135 may be positioned at upper and lower ends of the other end of the speaker 110.

A plurality of the path change member 135 may be disposed outside the throat tube 131. A first path change member 135*a* and a second path change member 135*b* may be symmetrical to each other, the first path change member 135*a* positioned at an upper end of the other end of the speaker 110 and the second path change member 135*b* positioned at a lower end of the other end of the speaker 110.

Here, the first path change member 135*a* and the second path change member 135*b* may have configurations identical to each other. The second path change member 135*b* may thus be understood from the description of the first path change member 135*a*.

The first path change member 135*a* may have one end opened to be connected to the speaker 110 and another end that is closed and opposite to the one end.

An inlet 136 may be formed at the one end of the first path change member 135*a*, and through the inlet 136, the sound generated from the speaker 110 may be introduced into the first path change member 135*a*.

The first path change member 135*a* may include a plurality of slits (e.g. a plurality of a first slit 137 and a plurality of a second slit 138) to extend a movement path of sound introduced into the first path change member 135*a*.

The plurality of slits may be arranged to be spaced apart parallel to each other in a direction from the one end of the first path change member 135*a* toward the other end thereof. In addition, the plurality of slits may extend perpendicular to the direction from the one end of the first path change member 135*a* toward the other end thereof.

The plurality of slits may alternately protrude from both sidewalls between the one end and the other end of the first path change member 135*a*. In detail, the first slit 137 may protrude from an upper wall 132*a* of the first path change member 135*a*. The second slit 138 may protrude from a lower wall 132*b* of the first path change member 135*a* alternately with the first slit 137.

The first slit 137 may extend from the upper wall 132*a* to be spaced apart from the lower wall 132*b*, and the second slit 138 may extend from the lower wall 132*b* to be spaced apart from the upper wall 132*a*.

An extension path 139, through which the sound may move, may be formed in the first path change member 135*a* by the plurality of slits (e.g. the plurality of the first slit 137, and the plurality of the second slit 138). The plurality of slits may be arranged to form a single extension path 139, through which sound may move, in the first path change member 135*a*.

The extension path 139 may be formed in a zigzag pattern, and thus have a length longer than that of the second side surface 110*b* of the speaker 110.

In this case, the path change member 135 may include a material such as a sound absorbing material to further extend the path through which the sound moves. In detail, outer surfaces of the plurality of the first slit 137 and the plurality of the second slit 138 forming the extension path 139 may further include the sound absorbing material.

The sound absorbing material may be a material capable of absorbing sound. In detail, the sound absorbing material may be various materials such as cloth, woven, polymer, and the like.

The movement path of the sound introduced into the path change member 135 is described below in detail with reference to FIG. 3.

Figure 5A:
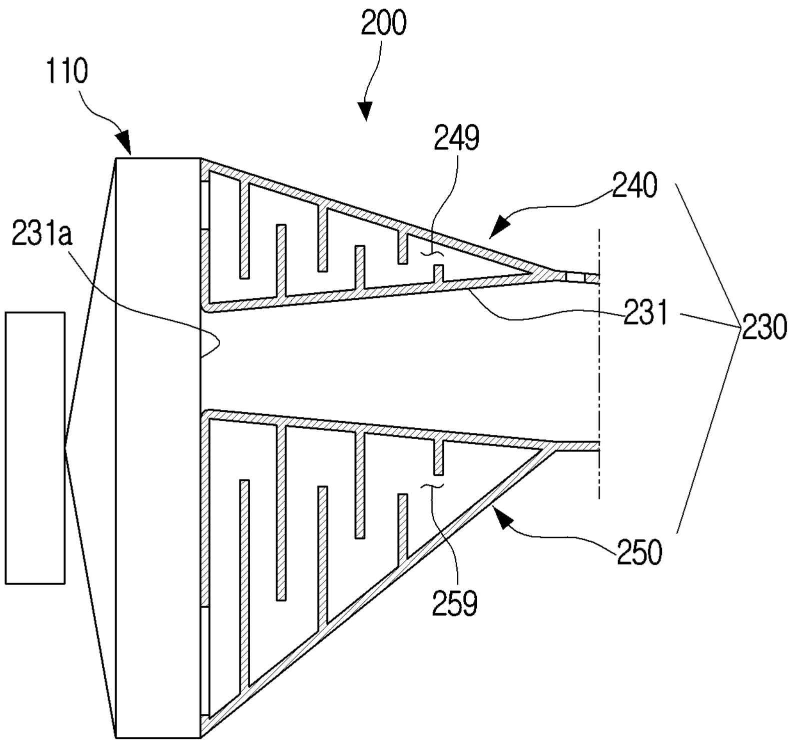
FIG. 5A is a schematic view of a sound output device according to a second embodiment in the disclosure.
Figure 5B:
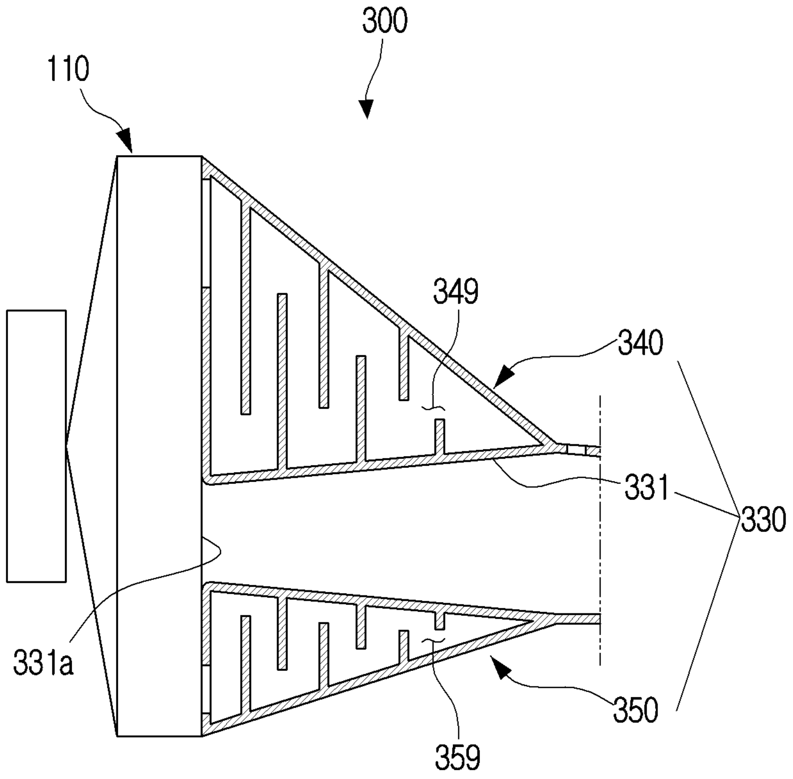
FIG. 5B is a schematic view of a sound output device according to a third embodiment in the disclosure.

FIG. 2 illustrates that the first path change member 135*a* and the second path change member 135*b* are symmetrical to each other with respect to the throat tube 131, but the path change members are not limited thereto. As illustrated in FIGS. 5A and 5B, the first path change member 135*a* and the second path change member 135*b* may have configurations different from each other.

Figure 3:
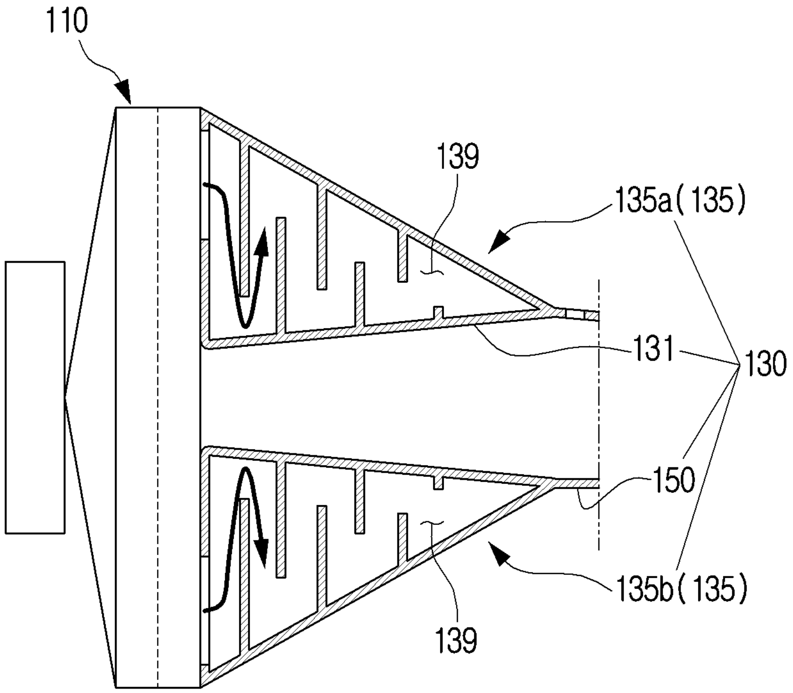
FIG. 3 is a schematic view of a path change member included in a sound output device according to an embodiment in the disclosure.

FIG. 3 is a schematic view of a path change member included in a sound output device according to an embodiment in the disclosure.

Referring to FIG. 3, some of the sound generated from the speaker 110 may be introduced into one end of the first path change member 135*a*. The sound introduced into the first path change member 135*a* through the inlet 136 may move to another end of the first path change member 135 along the extension path 139, and may be reflected at the other end, which is closed, to move back toward the inlet 136 along the extension path 139.

Some of the sound generated from the speaker 110 may be introduced into one end of the second path change member 135*b*. The sound introduced into the second path change member 135*b* through the inlet 136 may move to the other end along the extension path 139, and may be reflected at the other end, which is closed, to move back toward the inlet 136 along the extension path 139.

Meanwhile, the rest of the sound generated from the speaker 110 may be introduced into the throat tube 131 and move to the guide tube 150.

A movement distance of the sound introduced into the path change member 135 and moved along the extension path 139 may be a longer than a movement distance of the sound through the throat tube 131. In this manner, the path change member 135 may extend a movement path of some of the sounds generated from the speaker 110.

The path change member 135 may shift a specific frequency band in which interference occurs due to the sound having the extended movement path. The path change member 135 may shift the specific frequency band in which the interference occurs out of an audible region. Accordingly, the sound output device 100 may have reduced degradation of acoustic characteristics.

Figure 4A:
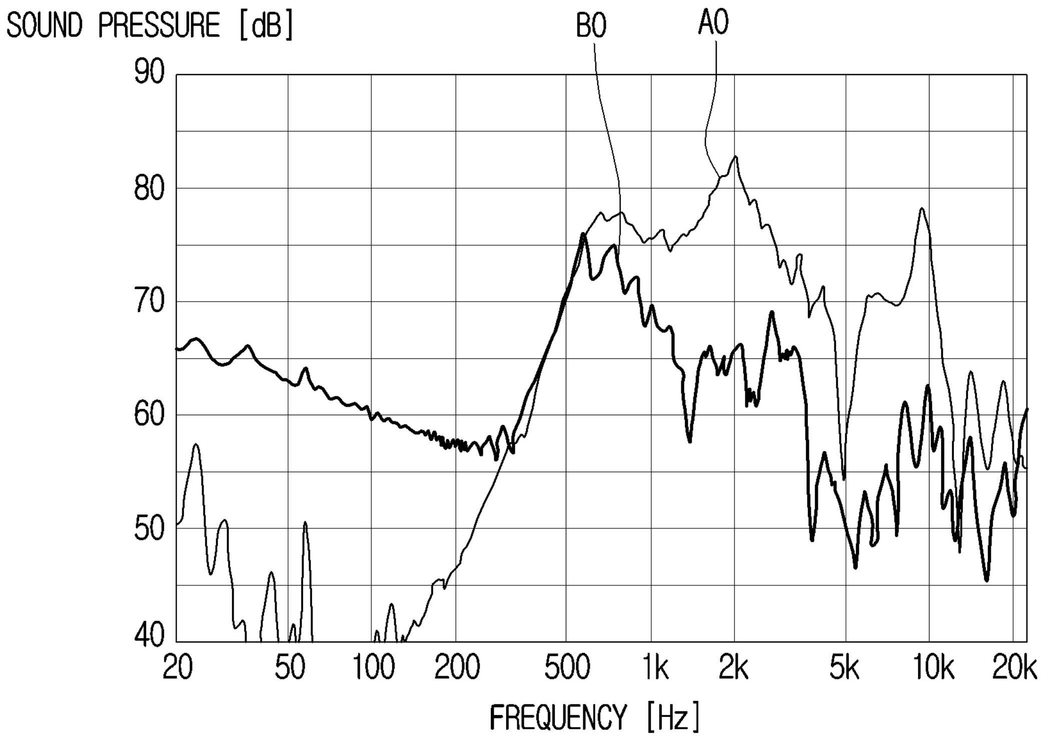
FIG. 4A is a frequency-sound pressure graph of a sound output device according to related art.
Figure 4B:
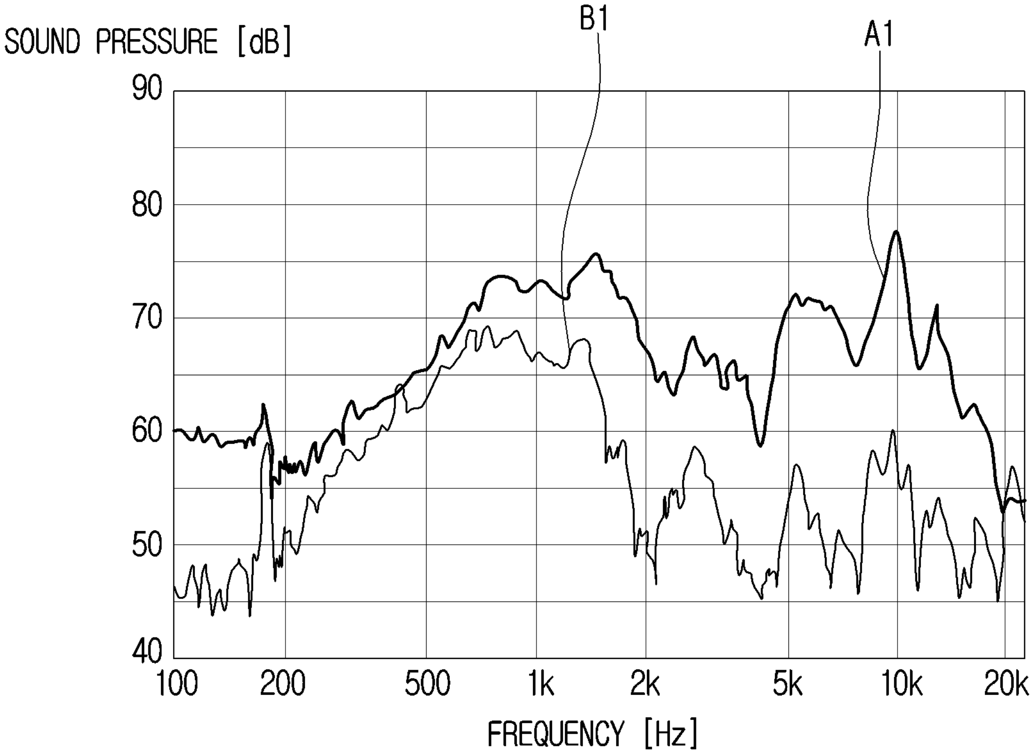
FIG. 4B is a frequency-sound pressure graph of a sound output device according to an embodiment in the disclosure.

FIG. 4A is a frequency-sound pressure graph of a sound output device according to related art, and FIG. 4B is a frequency-sound pressure graph of a sound output device according to an embodiment in the disclosure.

Referring to FIG. 4A, the sound output device according to the related art may include a speaker formed in an oval type having an oval cross section.

A first line A0 illustrates a frequency-sound pressure of the sound output from the sound output device in case that 70° is a measurement angle, and a second line B0 illustrates a frequency-sound pressure of the sound output from the sound output device in case that 0° is the measurement angle.

Figure 4C:
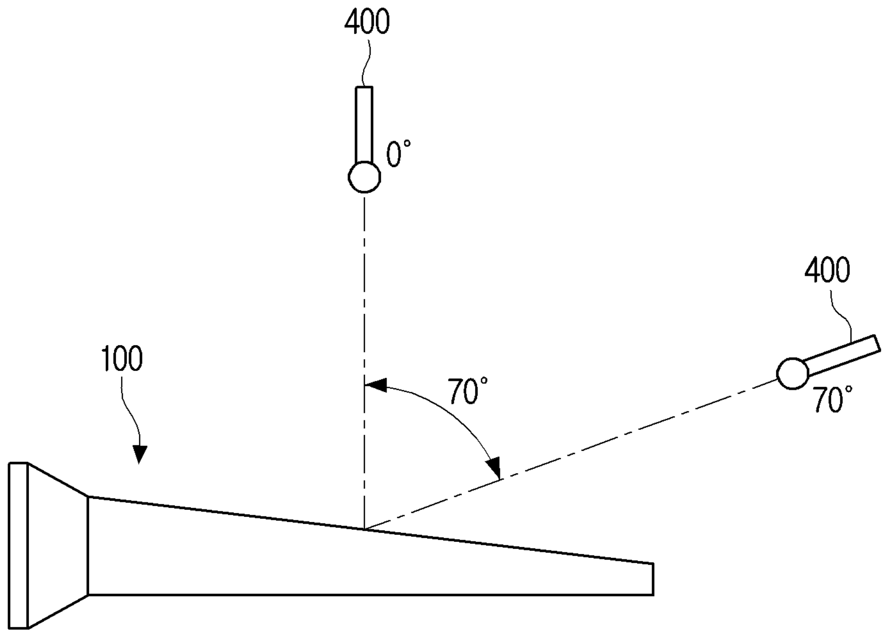
FIG. 4C is a schematic view illustrating a measurement angle for measuring a frequency-sound pressure for a sound output device.

Here, as illustrated in FIG. 4C, the measurement angle may refer to an angle at which a measurement device 400 is disposed with respect to the sound output device to measure various output elements such as frequency, sound pressure, and the like of the sound output device.

Referring to the first line A0 and the second line B0, the response characteristics of the frequency at which the interference occurs may become worse due to the interference occurring due to the length of an end of the speaker.

Sound quality degradation may occur at a specific frequency due to destructive interference caused by the length of the end of the speaker. In detail, the sound pressure of a specific frequency of 5 k [Hz] may be lowered by the interference.

As the length of the end of the speaker increases, the sound output device may have a lower frequency band in which the sound quality degradation occurs.

Meanwhile, referring to FIG. 4B, the sound output device 100 according to an embodiment in the disclosure may include the path change member 135.

A first line A1 illustrates a frequency-sound pressure of the sound output from the sound output device 100 in case that 70° is the measurement angle, and a second line B1 illustrates a frequency-sound pressure of the sound output from the sound output device 100 in case that 0° is the measurement angle.

In the sound output device 100 according to an embodiment in the disclosure, an even frequency response may be shown in a frequency band between 20 [Hz] and 20 k [Hz] without significant sound quality degradation.

The path change member 135 may shift the specific frequency band in which the interference occurs to a lower frequency band by extending the length of the path through which the sound moves. As a result, it is possible to avoid the interference at 5 k [Hz], which is a frequency band easily recognized by the user.

FIG. 5A is a schematic view of a sound output device according to a second embodiment in the disclosure, and FIG. 5B is a schematic view of a sound output device according to a third embodiment in the disclosure.

Referring to FIGS. 5A and 5B, configurations of each of the sound output device 200 and the sound output device 300 may be identical to that of the sound output device 100 described with reference to FIG. 2, except that configurations of the waveguide 230 and the waveguide 330 are different from that of waveguide 130.

Referring to FIG. 5A, a throat tube 231 may be positioned at an upper portion of the other end of the speaker 110. That is, a throat 231*a* of the throat tube 231 may be positioned above the center of the other end of the speaker 110.

Even in a case that the throat tube 231 is disposed at the upper portion of the speaker 110, the interference may degrade the response characteristics of a specific frequency.

The waveguide 230 may include path change members to minimize the interference caused by the longitudinal mode of the speaker 110.

The path change members may include a first path change member 240 positioned above the throat tube 231 and a second path change member 250 positioned below the throat tube 231.

One ends of the first path change member 240, which are adjacent to the speaker 110, may be at the upper end of the speaker 110 and the upper end of the throat tube 231, respectively, and one ends of the second path change member 250, which are adjacent to the speaker 110, may be formed at the lower end of the speaker 110 and the lower end of the throat tube 231, respectively.

Accordingly, an extension path 249 formed in the first path change member 240 may be shorter than an extension path 259 formed in the second path change member 250.

Referring to FIG. 5B, a throat tube 331 may be positioned at a lower portion of the other end of the speaker 110. That is, a throat 331*a* of the throat tube 331 may be positioned below the center of the other end of the speaker 110.

Even in a case that the throat tube 331 is disposed at the lower portion of the speaker 110, the interference may degrade the response characteristics of a specific frequency. The waveguide 330 may include path change members to minimize the interference caused by the longitudinal mode of the speaker 110.

The path change members may include a first path change member 340 positioned above the throat tube 331 and a second path change member 350 positioned below the throat tube 331.

One ends of the first path change member 340, which are adjacent to the speaker 110, may be at an upper end of the speaker 110 and the upper end of the throat tube 331, respectively, and one ends of the second path change member 350, which are adjacent to the speaker 110, may be at the lower end of the speaker 110 and the lower end of the throat tube 331, respectively.

Accordingly, an extension path 349 formed in the first path change member 340 may be longer than an extension path 359 formed in the second path change member 350.

Figure 6:
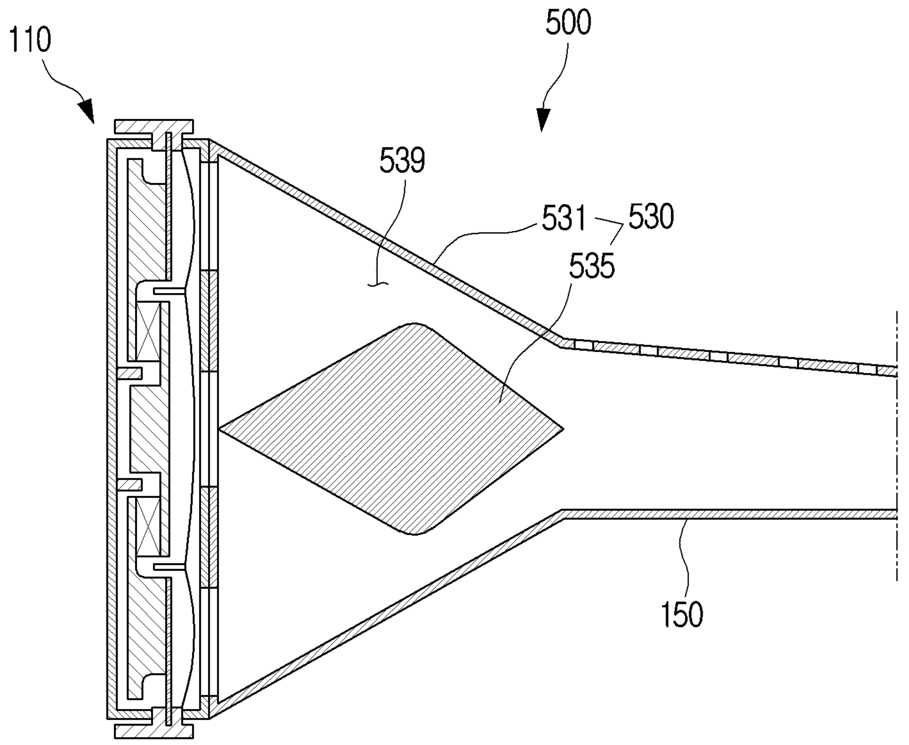
FIG. 6 is a partially enlarged view of a cross-section of a sound output device according to a fourth embodiment in the disclosure.

FIG. 6 is a partially enlarged view of a cross-section of a sound output device according to a fourth embodiment in the disclosure.

Referring to FIG. 6, configurations of a sound output device 500 may be identical to that of the sound output device 100 described with reference to FIG. 2, except that a configuration of a waveguide 530 is different from that of the waveguide 130.

Referring to FIG. 6, the waveguide 530 may be disposed between the speaker 110 and the guide tube 150. The waveguide 530 may include a throat tube 531 and at least one path change member 535.

The throat tube 531 may be disposed between the speaker 110 and the guide tube 150. The throat tube 531 may have one end at which the speaker 110 is disposed and another end to which one end of the guide tube 150 is connected.

The throat tube 531 may be formed in a shape of a hollow tube. An inside of the throat tube 531 may have a gradually decreasing width.

The path change member 535 may adjust the predetermined frequency band of the sound in the process of transmitting the sound generated from the speaker 110 to the guide tube 150, and the path change member 535 may have one end at which the speaker 110 is disposed.

The path change member 535 may be disposed in the throat tube 531. In detail, the path change member 535 may be disposed at a center in the throat tube 531.

The path change member 535 may be formed in a quadrangular shape. In detail, the path change member 535 may be formed in a rhombus shape, and each vertex thereof may have a predetermined curvature.

The path change member 535 may be formed in various shapes. The path change member 535 may be set in length, height, size, and shape to shift the specific frequency at which interference occurs. In detail, the path change member 535 may be formed in a round or oval shape or the like.

The path change member 535 may be disposed to be spaced apart from a sidewall of the throat tube 531 to allow sound to move through a space between the path change member 535 and the throat tube 531. The space between the path change member 535 and the sidewall of the throat tube 531 may form an extension path 539 through which the sound moves.

The path change member 535 may be disposed in such a manner that a vertex toward the speaker 110 of the path change member 535 is positioned at the center of the other end of the speaker 110.

The path change member 535 may adjust a predetermined band of the sound generated from the speaker 110. The sound generated from the speaker 110 may have a movement path detoured by the path change member 535 to adjust the predetermined band of the sound to another band.

In this case, in order to further reduce a wavelength through the path change member 535, the path change member 535 may include a material such as a sound absorbing material or the like. In detail, an outer surface of the path change member 535 forming the extension path 539 may further include the sound absorbing material.

The sound absorbing material may be a material capable of absorbing sound. In detail, the sound absorbing material may be various materials such as cloth, woven, polymer, and the like.

FIG. 6 illustrates that a single path change member 535 is disposed in the throat tube 531, but is not limited thereto, and a plurality of the path change member 535 may be disposed in the throat tube 531. In this case, a space between the plurality of the path change member 535 and a space between one of the path change member 535 and the throat tube 531 may form movement paths through which the sound moves.

Figure 7:
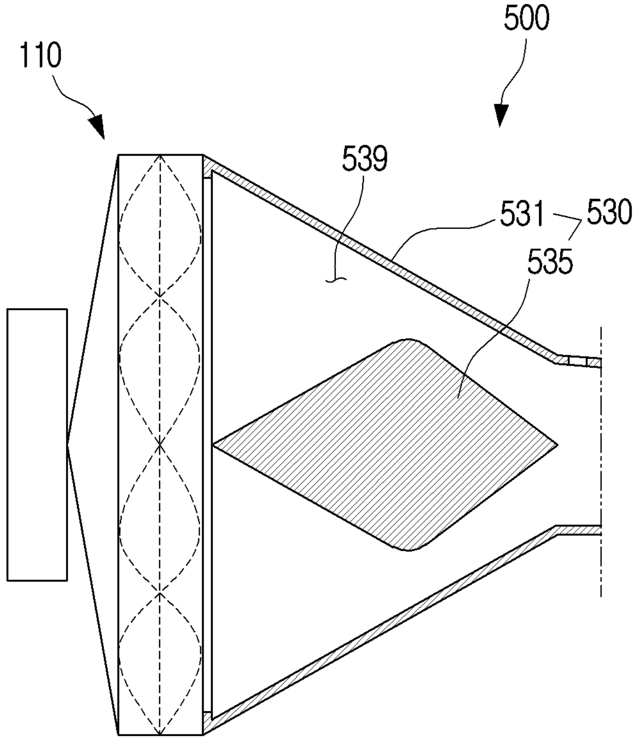
FIG. 7 is a schematic view of a path change member included in a sound output device according to the fourth embodiment in the disclosure.

FIG. 7 is a schematic view of a path change member included in a sound output device according to the fourth embodiment in the disclosure.

Referring to FIG. 7, the sound generated from the speaker 110 may be introduced to the throat tube 531. The introduced sound may have a changed wavelength by the path change member 535 disposed in the throat tube 531.

In detail, the wavelength of the sound generated from the speaker 110 may be reduced to ¼λ. The frequency may be increased as the wavelength of the sound is reduced. The path change member 535 may thus shift the specific frequency band in which the interference occurs out of the audible region. Accordingly, the sound output device 500 may reduce degradation of acoustic characteristics.

Figure 8:
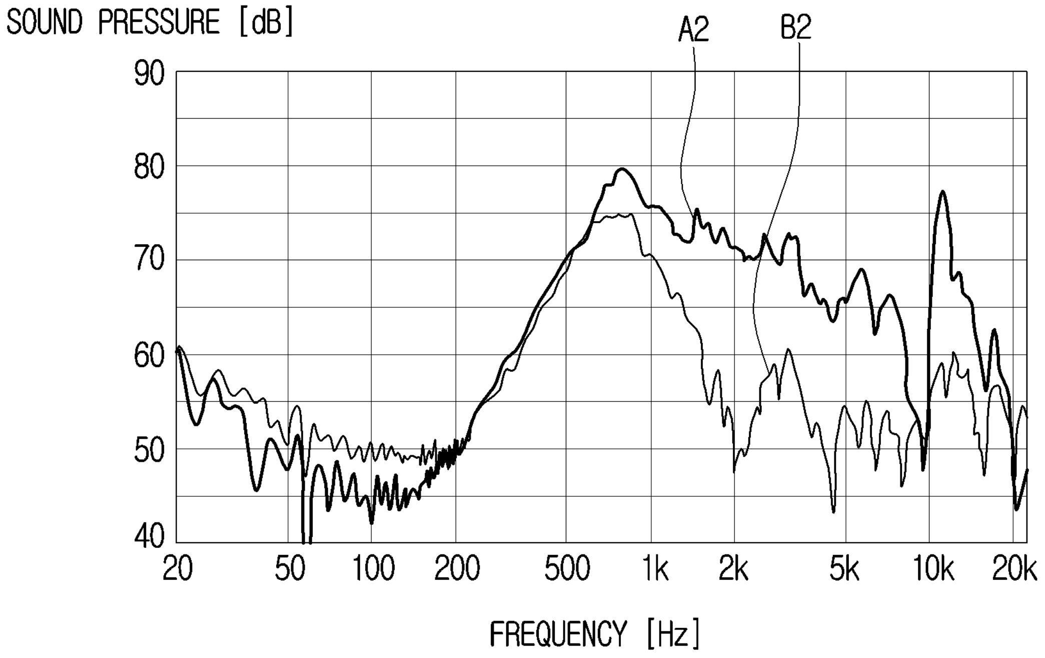
FIG. 8 is a frequency-sound pressure graph of a sound output device according to the fourth embodiment in the disclosure.

FIG. 8 is a frequency-sound pressure graph of a sound output device according to the fourth embodiment in the disclosure.

Referring to FIG. 8, the sound output device 500 according to the fourth embodiment in the disclosure may include the path change member 535 disposed in the throat tube 531.

A first line A2 illustrates a frequency-sound pressure of the sound output from the sound output device 500 in a case that 70° is the measurement angle, and a second line B2 illustrates a frequency-sound pressure of the sound output from the sound output device 500 in a case that 0° is the measurement angle.

In the sound output device 500 according to an embodiment in the disclosure, the path change member 535 may shift a frequency band in which interference occurs, and thus the interference may occur out of a frequency band to be used.

The path change member 535 may reduce the wavelength to shift the specific frequency band in which the interference occurs to a higher frequency band. As a result, it is possible to avoid the interference at 5 k [Hz], which is a frequency band easily recognized by the user.

Figure 9:
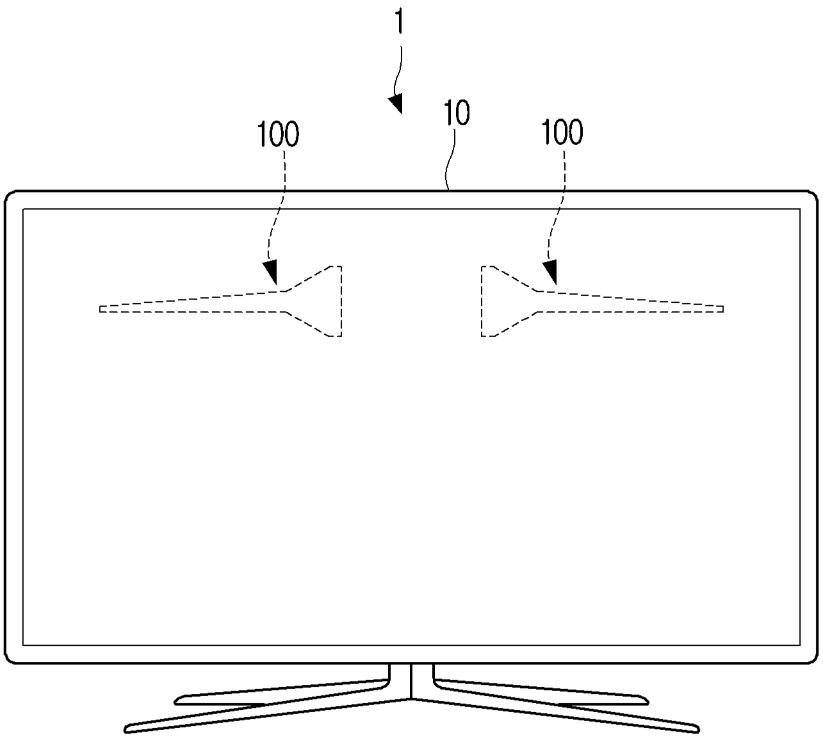
FIG. 9 is a front view of a display device including a sound output device according to a fifth embodiment in the disclosure.

FIG. 9 is a front view of a display device including a sound output device according to a fifth embodiment in the disclosure.

Referring to FIG. 9, one or more of the sound output device 100 may be included in the display device 1.

The display device 1 may include a display 10 configured to display an image; and a sound output device 100 disposed at one side of the display 10.

The sound output device 100 may be disposed at an upper portion of a rear surface of the display 10 and used as a surround speaker. In detail, the sound output device 100 may receive a drive signal from an amplifier (not illustrated) of the display device 1 and output a sound corresponding to the received drive signal. The amplifier may also be implemented in the sound output device 100.

In addition, the display device 1 may include a pair of front speakers (not illustrated) disposed at both sides of a lower portion of the display 10, and a woofer speaker (not illustrated) generating low-range sound.

The sound output device 100 may be used as a directional speaker and a pair of the sound output device 100 may be disposed at the display 10 to be symmetrical to each other. The pair of the sound output device 100 may output sound in both side directions of the display 10. Here, an image may be displayed on a front surface of the display 10, the sound output device 100 may be disposed at a rear side of the display 10 which is invisible to a viewer.

The sound output device 100 is described to be disposed at the upper portion of the display 10, but is not limited thereto, and the sound output device 100 may be disposed at the upper portion, the lower portion, or a center portion of the display 10 depending on a design.

In addition, even though illustrated and described to be disposed only at the display device 1, the sound output device 100 may be implemented to operate as a separate device independent from the display 10. In this case, the sound output device 100 may be referred to as a sound bar or a speaker device.

Hereinabove, non-limiting example embodiments in the disclosure are described. It is to be understood that terms used herein are provided to describe non-limiting example embodiments in the disclosure rather than limiting the disclosure. Various modifications and alternations to embodiments of the disclosure may be made according to the contents described above.

What is claimed is:

1. A sound output device comprising:

a speaker configured to generate sound;

a guide tube formed in a shape of a hollow tube, the guide tube configured to receive the sound generated from the speaker, through an end of the guide tube, and output the received sound; and a waveguide disposed between the speaker and the guide tube, wherein the waveguide comprises:

a throat tube configured to connect the speaker and the guide tube to each other, and formed in a shape of a hollow tube, and at least one path change structure configured to adjust a predetermined frequency band of the sound in a process of transmitting the sound generated from the speaker to the guide tube, wherein the at least one path change structure is disposed outside the throat tube, comprises a first end that is open and connected to the speaker, and further comprises a second end, opposite to the first end, that is closed, wherein the first end is configured to receive first sound of the sound that is generated by the speaker, and wherein the second end, that is closed, is configured to reflect the first sound, that travels into the first end, back to the first end.

2. The sound output device according to claim 1, wherein the at least one path change structure further comprises a plurality of protrusions forming an extension path of the at least one path change structure, the extension path having a length longer than a length of the speaker.

3. The sound output device according to claim 2, wherein the plurality of protrusions extend parallel to each other, and are spaced from each other in a first direction from the first end toward the second end of the at least one path change structure.

4. The sound output device according to claim 3, wherein the plurality of protrusions extend parallel to each other in a second direction that is perpendicular to the first direction.

5. The sound output device according to claim 2, wherein the plurality of protrusions alternately protrude from two sidewalls of the at least one path change structure, between the first end and the second end of the at least one path change structure.

6. The sound output device according to claim 1, wherein the at least one path change structure is a plurality of path change structures that are symmetrical to each other with respect to the throat tube.

7. The sound output device according to claim 1, wherein the at least one path change structure comprises a sound absorbing material.

8. The sound output device according to claim 1, wherein the speaker comprises a voice coil, a magnet, and a vibration plate that is configured to be vibrated by the voice coil and the magnet to generate the sound.

9. The sound output device according to claim 8, wherein a throat of the throat tube has a smaller length than a length of the vibration plate of the speaker.

10. The sound output device according to claim 1, wherein the at least one path change structure comprises:

a first path change structure above the throat tube; and a second path change structure below the throat tube, and wherein a shape of the first path change structure is different from a shape of the second path change structure, such that a sound pathway in the first path change structure, from the first end to the second end of the first path change structure, has a length different from a length of a sound pathway in the second path change structure, from the first end to the second end of the second path change structure.

11. The sound output device according to claim 1, wherein the throat tube comprises a throat that is configured to guide the sound that is previously reflected from the second end of the at least one path change member and then discharged back to the throat tube via the first end.

12. A display device comprising:

a display configured to display an image; and at least one sound output device disposed at one side of the display, wherein the at least one sound output device comprises:

a speaker configured to generate sound, a guide tube formed in a shape of a hollow tube, the guide tube configured to receive the sound generated from the speaker, through an end of the guide tube, and output the received sound, and a waveguide disposed between the speaker and the guide tube, and wherein the waveguide comprises at least one path change structure configured to adjust a predetermined frequency band of the sound in a process of transmitting the sound generated from the speaker to the guide tube, wherein the waveguide further comprises a throat tube configured to connect the speaker and the guide tube to each other, and the throat tube is formed in a shape of a hollow tube, wherein the at least one path change structure is disposed outside the throat tube, comprises a first end that is open and connected to the speaker, and further comprises a second end, opposite to the first end, that is closed, wherein the first end is configured to receive first sound of the sound that is generated by the speaker, and wherein the second end, that is closed, is configured to reflect the first sound, that travels into the first end, back to the first end.

13. The display device according to claim 12, wherein the at least one sound output device is a plurality of sound output devices that are disposed, at the display, symmetrical with respect to each other in left and right directions.

14. The display device according to claim 12, wherein the at least one path change structure comprises a plurality of protrusions forming an extension path of the at least one path change structure, the extension path having a length longer than a length of the speaker.

15. The display device according to claim 12, wherein the at least one path change structure comprises:

a first path change structure above the throat tube; and a second path change structure below the throat tube, and wherein a shape of the first path change structure is different from a shape of the second path change structure, such that a sound pathway in the first path change structure, from the first end to the second end of the first path change structure, has a length different from a length of a sound pathway in the second path change structure, from the first end to the second end of the second path change structure.

16. The display device according to claim 12, wherein the throat tube comprises a throat that is configured to guide the sound that is previously reflected from the second end of the at least one path change member and then discharged back to the throat tube via the first end.

* * * * *